July 5, 1932.　　　A. ELLERBY　　　1,866,402

WINDSHIELD WIPER HOLDER

Filed April 23, 1931

INVENTOR
Alfred Ellerby
By Hazard and Miller
ATTORNEYS

Patented July 5, 1932

1,866,402

UNITED STATES PATENT OFFICE

ALFRED ELLERBY, OF LOS ANGELES, CALIFORNIA

WINDSHIELD-WIPER HOLDER

Application filed April 23, 1931. Serial No. 532,259.

My invention relates to a windshield-wiper holder, such being a device to hold a windshield wiper when inoperative out of the line of vision of the driver, this device being an accessory for an automobile. For this purpose I employ a vacuum cup with a bracket formed integral with the back portion of the cup. The cup may be secured to a windshield by the suction of such cup and is preferably placed on the upper part of the windshield so that the flat blade of the wiper may rest on the top of the bracket. The blade must be lifted on to the bracket and removed therefrom to place the wiper in its inoperative position and to allow use of such wiper.

My invention is illustrated in connection with the accompanying drawing, in which.

Figure 1:
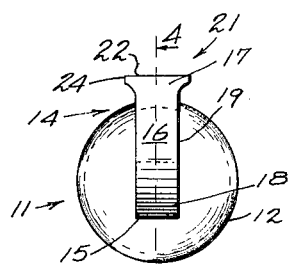
Fig. 1 is a rear elevation of my invention taken in the direction of the arrow 1 of Fig. 3.
Figure 2:
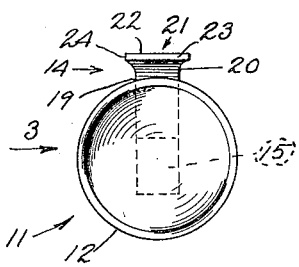
Fig. 2 is a front elevation taken in the direction of the arrow 2 of Fig. 3.
Figure 3:
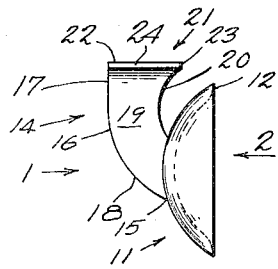
Fig. 3 is a side elevation taken in the direction of the arrow 3 of Fig. 2.
Figure 4:
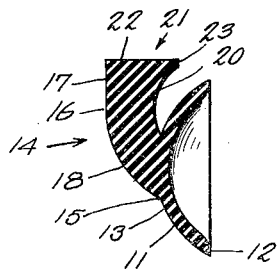
Fig. 4 is a vertical section taken on the line 4—4 of Fig. 1 in the direction of the arrows.

In the drawing I illustrate a vacuum cup 11 which is formed, preferably, of a good grade of resilient rubber. This cup has a rim 12 which is circular; the edge of the rim is in a common plane and is adapted to fit snugly on the glass of a windshield. The rim may be slightly moistened with oil, which causes it to adhere better to the windshield. Such cup is attached by compressing the cup to expel the air and retained in place by the air pressure on the back portion 13 of the cup.

My invention includes a bracket structure designated by the assembly number 14, which is formed integral with the cup, being made, preferably, of rubber, and is secured to the back of the cup at the section indicated at 15. This bracket has a rear face 16, the upper part of which is substantially vertical, as illustrated at 17, and the lower portion 18 is secured to the point of merging with the back of the cup. The bracket has opposite sides 19 which are parallel and vertical. The front face 20 has an arcuate curve, this being formed concave, the lower edge of this surface merging with the back of the cup. The bracket has a head 21 with a flat upper surface 22. Surrounding the head at the front there is a slight rim 23 and at the sides a slight rim 24. It will be noted that the head is slightly greater in area than the cross sections of the bracket between the head and the cup. This is to give a good surface bearing for the windshield-wiper blade.

The device is placed on the windshield, as above mentioned, by compressing the cup, and is located above the arc of travel of a wiper, which moves through part of a circle. It is placed with the bracket vertical so that the upper surface 24 is horizontal. The blade of the wiper, when the mechanism for actuating the wiper is de-energized, is located on the top of the bracket by slightly bending the wire supporting the blade outwardly and moving the blade with the wire upwardly so that the blade may rest on the surface 24. When the cup is attached to a windshield, a portion of the cup is compressed into the curved section of the concave face 20 of the bracket. This gives a support by the top of the bracket in close to the windshield, the metal part of the wiper blade resting on the top surface 22, with the rubber strips of the wiper extending toward the windshield.

A feature of my invention is that the holder uses a vacuum cup as the retaining medium on the windshield, and the holder for the wiper comprises the bracket formed integral with the cup, this bracket being shaped to accommodate the compressed cup and having a flat top on which the wiper blade may rest.

Figure 6:
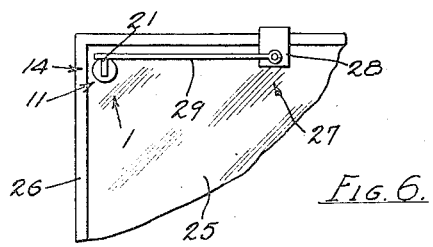
Fig. 6 is a front elevation of part of a windshield, illustrating the manner of use of my invention.

In Fig. 6 I illustrate my invention as applied to a windshield, in which the windshield glass is indicated by the numeral 25, this being held in a frame 26. The windshield wiper designated by the assembly numeral 27 has a holder structure 28 and a blade 29. The blade is illustrated as in Fig. 5 with a metal portion 30 and the flexible rubber webs 31. It will be noted by reference to Fig. 5 that the cup when compressed fills in the hollow formed by the concave curved side 20. The metal blade with the rubber webs rests on the top surface 24.

Figure 5:
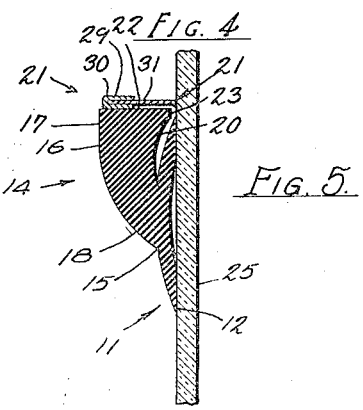
Fig. 5 is a vertical section similar to Fig. 4, but showing the holder attached to a windshield.

It will be noted by Fig. 5 that due to the curved front face 20 of the bracket 14 that when the vacuum cup is attached to the windshield and such cup is compressed the inner edge 23 of the top of the bracket is brought close to the windshield. This causes the top of the bracket to give a more efficient support to the windshield wiper than if the top were spaced a considerable distance from the windshield.

Various changes may be made in the details of construction without departing from the spirit or scope of the invention as defined by the appended claims.

I claim:

1. A holder for a windshield-wiper comprising a resilient rubber vacuum cup having a bracket formed integral therewith, the bracket being attached to the back of the cup and extending upwardly with two sides, back and front walls, the front wall being concave in shape to accommodate the compressed cup, the top of the bracket being flat to form a support for a windshield-wiper blade, said concave curve of the front of the bracket being adapted to bring the inner edge of the flat horizontal surface of the bracket close to the windshield when the cup is compressed.

2. A holder for a windshield-wiper comprising a resilient rubber vacuum cup having a rim to engage a windshield, and a convexly arcuate back wall, an integral rubber bracket secured to the back wall at substantially the center, said bracket having two parallel sides, the rear surface merging with the back of the cup, the front surface having a concave curve and merging with the back of the cup, the bracket having an enlarged head with a horizontal bearing surface adapted to support the blade of a windshield-wiper, said concave curve of the front of the bracket being adapted to bring the inner edge of the flat horizontal surface of the bracket close to the windshield when the cup is compressed.

3. A holder for a windshield-wiper comprising a resilient rubber vacuum cup having a rim and a convexly arcuate back surface, a bracket formed of rubber and at its lower portion merging into the back of the cup, the bracket having parallel sides and extending beyond the peripheral edge of the cup, the back face of the bracket having at the bottom a convex curve merging with the back of the cup, the front of the bracket having a concave curve to accommodate the compressed cup, the top of the bracket having a flat horizontal surface to support the blade of a windshield wiper, said concave curve of the front of the bracket being adapted to bring the inner edge of the flat horizontal surface of the bracket close to the windshield when the cup is compressed.

4. A holder for a windshield wiper employing a vacuum cup, such cup having a concave inner surface and a convex outer surface with a peripheral edge to contact with and engage a windshield combined with a bracket attached to the back or outside face of the cup and extending upwardly, such bracket having a concave curve on the side adjacent the outside of the cup and terminating at the top in a flat horizontal surface, said concave curve of the front of the bracket being adapted to bring the inner edge of the front horizontal surface close to a windshield when the cup is attached and compressed against a windshield, the horizontal cross section of the bracket at and adjacent the top being greater than the horizontal cross sectional area between the top and the place of attachment on the bracket to the cup.

ALFRED ELLERBY.